(12) United States Patent
Lim

(10) Patent No.: US 12,469,170 B2
(45) Date of Patent: Nov. 11, 2025

(54) APPARATUS AND METHOD FOR DETECTING A 3D OBJECT

(71) Applicants: HYUNDAI MOTOR COMPANY, Seoul (KR); KIA CORPORATION, Seoul (KR)

(72) Inventor: Hyun Kyu Lim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 476 days.

(21) Appl. No.: 17/967,534

(22) Filed: Oct. 17, 2022

(65) Prior Publication Data
US 2023/0316569 A1 Oct. 5, 2023

(30) Foreign Application Priority Data

Apr. 5, 2022 (KR) .................. 10-2022-0042186

(51) Int. Cl.
*G06T 7/73* (2017.01)
*G06T 7/10* (2017.01)

(52) U.S. Cl.
CPC .................. *G06T 7/75* (2017.01); *G06T 7/10* (2017.01); *G06T 2207/20084* (2013.01)

(58) Field of Classification Search
CPC . G06T 7/0002; G06T 7/10; G06T 7/11; G06T 7/70; G06T 7/75; G06T 2207/10012; G06T 2207/20021; G06T 2207/20081; G06T 2207/20084; G06V 10/147; G06V 10/26; G06V 10/454; G06V 10/82; G06V 20/58; G06V 20/647; G06N 3/08
See application file for complete search history.

(56) References Cited

U.S. PATENT DOCUMENTS

| 10,019,637 B2 | 7/2018 | Chen et al. |
| 10,176,390 B2 | 1/2019 | Chen et al. |

(Continued)

FOREIGN PATENT DOCUMENTS

| CN | 110349138 B | * | 7/2021 | ......... G06K 9/00664 |
| CN | 109214349 B | * | 8/2021 | ......... G06K 9/00791 |

(Continued)

OTHER PUBLICATIONS

Nguyen, Duy-Kien, et al. "BoxeR: Box-Attention for 2D and 3D Transformers." arXiv preprint arXiv:2111.13087 (2021). (Year: 2021).*

(Continued)

*Primary Examiner* — Shefali D Goradia
*Assistant Examiner* — Toluwani Mary-Jane Ijaseun
(74) *Attorney, Agent, or Firm* — Lempia Summerfield Katz LLC

(57) ABSTRACT

An apparatus and a method for detecting a three-dimensional (3D) object are provided. The apparatus includes a camera and a processor. The processor obtains a two-dimensional (2D) image using the camera, segments the 2D image to obtain free space information, extracts feature information associated with an object included in the 2D image from the 2D image, determines an attention score based on the free space information and the extracted feature information, using an attention mechanism, and detects 3D location information of the object from the image based on the attention score.

18 Claims, 4 Drawing Sheets

(56) References Cited

U.S. PATENT DOCUMENTS

| | | | |
|---|---|---|---|
| 2017/0140231 A1 | 5/2017 | Chen et al. | |
| 2020/0143557 A1* | 5/2020 | Choi | G06T 7/70 |
| 2020/0320327 A1* | 10/2020 | Fathi | G06V 20/70 |
| 2021/0110202 A1* | 4/2021 | Vu | G06V 10/25 |
| 2021/0209341 A1 | 7/2021 | Ye et al. | |
| 2021/0241522 A1 | 8/2021 | Guler et al. | |
| 2022/0020158 A1* | 1/2022 | Ning | G06T 7/246 |
| 2022/0084238 A1* | 3/2022 | Tang | G06V 20/10 |

FOREIGN PATENT DOCUMENTS

| | | |
|---|---|---|
| JP | 2017091549 A | 5/2017 |
| KR | 20190063153 A | 6/2019 |
| WO | 2020099338 A1 | 5/2020 |

OTHER PUBLICATIONS

Heylen, Jonas, et al. "Monocinis: Camera independent monocular 3d object detection using instance segmentation." Proceedings of the IEEE/CVF International Conference on Computer Vision. 2021. (Year: 2021).*

Shen, Xiaoke, and Ioannis Stamos. "3d object detection and instance segmentation from 3d range and 2d color images." Sensors 21.4 (2021): 1213. (Year: 2021).*

Li, Buyu, et al. "Gs3d: An efficient 3d object detection framework for autonomous driving." Proceedings of the IEEE/CVF conference on computer vision and pattern recognition. 2019. (Year: 2019).*

Brazil, Garrick, and Xiaoming Liu. "M3d-rpn: Monocular 3d region proposal network for object detection." Proceedings of the IEEE/CVF International Conference on Computer Vision. 2019.

Dijk, Tom van, and Guido de Croon. "How do neural networks see depth in single images?." Proceedings of the IEEE/CVF International Conference on Computer Vision. 2019.

* cited by examiner

APPARATUS AND METHOD FOR DETECTING A 3D OBJECT

CROSS-REFERENCE TO RELATED APPLICATION

This application claims the benefit of and priority to Korean Patent Application No. 10-2022-0042186, filed in the Korean Intellectual Property Office on Apr. 5, 2022, the entire contents of which are incorporated herein by reference.

TECHNICAL FIELD

The present disclosure relates to an apparatus and a method for detecting a three-dimensional (3D) object, and more particularly, to a technology of detecting a 3D object from an image.

BACKGROUND

Because a monocular image obtained by a monocular camera, that is, a two-dimensional (2D) image, does not have depth information, it is difficult to detect three-dimensional (3D) information from the monocular image. There is a method for detecting an object using a monocular 3D region proposal network (M3D-RPN) which is an anchor-based network. However, in this method, an analysis of whether the network detects 3D information based on a certain portion of the image is not generally performed.

The foregoing is intended merely to aid in the understanding of the background of the present disclosure, and is not intended to mean that the present disclosure falls within the purview of the related art that is already known to those having ordinary skill in the art.

SUMMARY

An aspect of the present disclosure provides an apparatus and a method for detecting a 3D object from a 2D image obtained by a monocular camera.

Another aspect of the present disclosure provides an apparatus and a method for improving the performance of detecting a 3D object by using segmentation information of an image to detect a location of the 3D object based on the segmentation information of the image.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for detecting a three-dimensional (3D) object may include a camera, storage, and a processor. The processor may obtain a two-dimensional (2D) image using the camera, may segment the 2D image to obtain feature information associated with a free space, may obtain feature information associated with an object included in the 2D image from the 2D image, may determine an attention score based on the feature information associated with the free space and the feature information associated with the object, using an attention mechanism, and may detect 3D location information of the object based on the attention score.

According to an embodiment, the processor may segment the 2D image into a plurality of regions, may perform prediction of the free space with respect to the plurality of regions, and may obtain the feature information associated with the free space based on the result of performing the prediction.

According to an embodiment, the processor may extract a query used in the attention mechanism from the feature information associated with the object, may extract a key used in the attention mechanism from the feature information associated with the free space, and may determine the attention score by multiplying the query by the key.

According to an embodiment, the processor may determine a value used in the attention mechanism to be the same as the query, may apply the value as a weight to the attention score to determine an attention value, and may decode the attention value to detect the 3D location information.

According to an embodiment, the 3D location information may include 3D coordinate information of the object.

According to an embodiment, the processor may compare the feature information associated with the free space with previously stored segmentation reference information to determine a segmentation loss for the feature information associated with the free space and may extract the key from the feature information associated with the free space with regard to the segmentation loss.

According to an embodiment, the processor may compare the 3D location information with previously stored 3D location reference information to determine a loss of the 3D location information.

According to an embodiment, the processor may include a backbone network that extracts the feature information associated with the object from the 2D image based on a hierarchical structure of a convolutional neural network (CNN).

According to an embodiment, the processor may detect 2D and 3D dimensions of the object and a 3D orientation of the object from the 2D image, based on the feature information associated with the object.

According to an embodiment, the camera may be a monocular camera.

According to an aspect of the present disclosure, a method for detecting a three-dimensional (3D) object may include obtaining a 2D image using a camera, segmenting the 2D image to obtain feature information associated with a free space, obtaining feature information associated with an object included in the 2D image from the 2D image, determining an attention score based on the feature information associated with the free space and the feature information associated with the object, using an attention mechanism, and detecting 3D location information of the object based on the attention score.

According to an embodiment, the obtaining of the feature information associated with the free space may include segmenting the 2D image into a plurality of regions, performing prediction of the free space with respect to the plurality of regions, and obtaining the feature information associated with the free space based on the result of performing the prediction.

According to an embodiment, the determining of the attention score may include extracting a query used in the attention mechanism from the feature information associated with the object, extracting a key used in the attention mechanism from the feature information associated with the free space, and determining the attention score by multiplying the query by the key.

According to an embodiment, the method may further include determining a value used in the attention mechanism to be the same as the query and applying the value as a weight to the attention score to determine an attention value.

The detecting of the 3D location information may include decoding the attention value to detect the 3D location information.

According to an embodiment, the 3D location information may include 3D coordinate information of the object.

According to an embodiment, the obtaining of the key may include comparing the feature information associated with the free space with previously stored segmentation reference information to determine a segmentation loss for the feature information associated with the free space and extracting the key from the feature information associated with the free space with regard to the segmentation loss.

According to an embodiment, the method may further include comparing the 3D location information with previously stored 3D location reference information to determine a loss of the 3D location information.

According to an embodiment, the obtaining of the feature information associated with the object may include extracting the feature information associated with the object from the 2D image using a backbone network based on a hierarchical structure of a convolutional neural network (CNN).

According to an embodiment, the method may further include detecting 2D and 3D dimensions of the object from the 2D image, based on the feature information associated with the object, and detecting an orientation of the object from the 2D image, based on the feature information associated with the object.

According to an embodiment, the 2D image may be a monocular image obtained using a monocular camera.

The effects that can be obtained from the present disclosure are not limited to the effects mentioned above, and unmentioned other effects may be clearly understood by those having ordinary skill in the art from the following description.

BRIEF DESCRIPTION OF THE DRAWINGS

The above and other objects, features and advantages of the present disclosure will be more apparent from the following detailed description taken in conjunction with the accompanying drawings.

Figure 1:
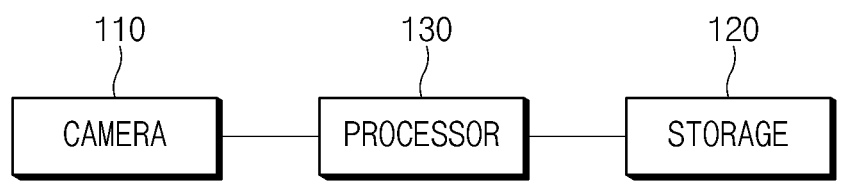
FIG. 1 is a block diagram illustrating an apparatus for detecting a 3D object according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the accompanying drawings. In the drawings, the same reference numerals are used throughout to designate the same or equivalent elements. In addition, a detailed description of well-known features or functions is omitted in order not to unnecessarily obscure the gist of the present disclosure.

In describing the components of the embodiments according to the present disclosure, tams such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

In embodiments of the present disclosure, information about a three-dimensional (3D) object is predicted using a result trained using a 2D image (e.g., a monocular image) in a process of obtaining autonomous driving recognition train data.

Hereinafter, embodiments of the present disclosure are described in detail with reference to FIGS. 1 to 4.

FIG. 1 is a block diagram illustrating an apparatus 100 for detecting a 3D object according to an embodiment of the present disclosure.

According to an embodiment, the apparatus for detecting the 3D object may be mounted on a vehicle to detect 3D object information (e.g., 3D location information (3D coordinate information), a 3D orientation, and/or 3D dimension information) about an object (e.g., a person (e.g., a pedestrian), another vehicle, a surrounding obstacle, an animal, and/or a building) around the vehicle.

According to an embodiment, the apparatus 100 may include a camera 110, storage 120, and a processor 130.

According to an embodiment, the camera 110 may obtain a two-dimensional (2D) image. The camera 110 may be a monocular camera having one lens. The 2D image may be a monocular image obtained using the monocular camera. The camera 110 may be installed in the center of a width of the vehicle and may face the front, the side, and/or the rear of the vehicle to be installed horizontally with respect to the ground.

According to an embodiment, the storage 120 may store the image (e.g., the 2D image) received from the camera 110. The storage 120 may store an artificial neural network learning algorithm for object detection, a result learned by the processor 130, an object detection model executed by the processor 130, and/or an object detection result.

The storage 120 may store computer readable instructions executable by the processor 130. The storage 120 may include at least one of storage media such as a flash memory, a hard disk, a solid state disk (SSD), a secure digital (SD) card, an embedded multimedia card (eMMC), universal flash storage (UFS), a removable disk, and/or web storage or storage media such as a random access memory (RAM), a static RAM (SRAM), a read only memory (ROM), a programmable ROM (PROM), an electrically erasable and programmable ROM (EEPROM), and/or an erasable and programmable ROM (EPROM).

According to an embodiment, the processor 130 may be electricity connected with the camera 110 and the storage 120. The processor 130 may perform operations of respective components of the apparatus 100 for detecting the 3D object and/or may perform a variety of data processing and calculations described herein. For example, the processor 130 may execute instructions stored in the storage 120 to perform operations described herein.

According to an embodiment, the processor 130 may obtain a 2D image using the camera 110. The processor 130 may segment the 2D image to obtain feature information associated with a free space. For example, the free space may refer to an object associated with the ground among objects included in the 2D image.

In embodiments, the processor 130 may segment the 2D image into a plurality of regions and may predict the free space for the plurality of regions. The processor 130 may obtain the feature information associated with the free space based on the result of predicting the free space. For example, the feature information associated with the free space may include a prediction result (e.g., confidence) indicating whether each region in the image corresponds to the free space. In an embodiment, as the predicted confidence is higher, the processor 130 may indicate a possibility that a corresponding region in the 2D image corresponds to the free space is higher.

In embodiments, a location or a size of the object in the image may have an influence on detecting the 3D object (e.g., 3D location information of the object) from the 2D image. The location of the object, among the location and the size of the object in the image, may be an element which has a relatively greater influence on detecting the 3D object when estimating a distance of the object. Furthermore, in an embodiment, because the detected object in the image is in contact with the ground, it is possible to use the object as a free space region.

According to an embodiment, when detecting the 3D object (e.g., the 3D location information of the object) using the feature information associated with the free space obtained (or extracted) from the 2D image, the processor 130 may use the 3D object as a guide. Because a segmentation task of the image is a task relatively easier than a 3D object detection task (e.g., a 3D location information detection task of the object), which will be described in more detail below, it may be easy to use the segmentation task of the image as a key of an attention mechanism. In other words, the processor 130 may determine a region to which to attend in the image by means of the segmentation task which may be relatively easy.

According to an embodiment, the processor 130 may obtain feature information associated with an object included in the 2D image from the 2D image. For example, the feature information associated with the object may include a feature for obtaining 3D object information extracted from the 2D image.

For example, the processor 130 may include a backbone network which extracts the feature information associated with the object from the 2D image based on a hierarchical structure of a convolutional neural network (CNN). In an embodiment, the CNN may be a type of deep neural network (DNN), which may be composed of one or more convolution layers, one or more pooling layers, and one or more fully connected layers.

The CNN may have a structure suitable for learning of 2D image (e.g., a 2D image) and may be trained by means of a backpropagation algorithm. The processor 130 may configure the backbone network having a scale-based hierarchical structure for the 2D image and may replace data for each scale with time series data by means of the backbone network to extract feature information about an object.

In embodiments, the processor 130 may include a monocular 3D region proposal network (M3D-RPN) which is an anchor-based network, and the backbone network may make up a portion of the M3D-RPN. For example, the M3D-RPN is a network which receives a 2D image as an input, generates a virtual 2D or 3D anchor box, and learns a difference in information between an object to be detected and the anchor box to detect a 3D object.

According to an embodiment, the processor 130 may determine an attention score based on the feature information associated with the free space and the feature information associated with the object, using the attention mechanism. For example, the processor 130 may include an attention module which performs the attention mechanism.

The attention mechanism is a mechanism which references all inputs again at every time when a prediction value is made and concentrates and references things associated with a value to be predicted, which is a mechanism which outputs a predicted result using an influenced feature (a query), an influencing feature (a key), and a weight (a value) for an influence. For example, each of the query, the key, and the value may be represented in the form of a matrix. In an embodiment, in the attention mechanism, importance (e.g., an attention score) for the prediction value may be obtained by a product (an inner product) of the query and the key.

The processor 130 may extract the query and the value from the feature information associated with the object extracted by means of the backbone network. The processor 130 may extract a key value from feature information associated with a segmentation obtained by segmenting the image.

According to an embodiment, the processor 130 may compare the feature information associated with the free space with previously stored segmentation reference information (e.g., segmentation ground truth or segmentation GT) to determine a segmentation loss for the feature information associated with the free space. The segmentation GT may be previously stored data for verifying the accuracy of feature information associated with the segmentation (e.g., the result of predicting the free space).

In an embodiment, the segmentation loss may indicate accuracy and/or error information obtained by comparing and analyzing the feature information associated with the segmentation (e.g., the result of predicting the free space) with the segmentation GT. The processor 130 may extract a key from the feature information associated with the free space with regard to the segmentation loss.

In an embodiment, the processor 130 may reflect the degree of influence on the free space in the image to detect 3D location information of the object by using the feature information associated with the object (e.g., feature information associated with a location of a 3D object) as the query and using the feature information associated with the segmentation as the key.

In an embodiment, the processor 130 may apply attention to a feature associated with the free space in the feature information associated with the object. In other words, as the feature is more similar to the free space in the feature information associated with the object, the attention score may have a larger value. For example, when the distance (or depth) of the object in the image is estimated, because the location of the object has a greater influence than the size of the object in the image and because the object (e.g., the vehicle) is in contact with the ground, when considering a feature on the free space region (e.g., a bottom region), accuracy may be enhanced when the distance of the object is estimated.

The processor 130 may detect 3D location information of the object based on the attention score. For example, the processor 130 may determine a value used in the attention mechanism to be the same as the query. Although the query and the value are generally described herein as being the same as each other because using the key associated with the free space in detecting the 3D location information of the object has a relatively more important influence in the present disclosure, the processor 130 may determine the value used in the attention mechanism to be different from the query in some embodiments.

The processor 130 may determine an attention value by applying the determined value as a weight to the attention score. For example, the processor 130 may determine an attention value by performing a product (an inner product) of the attention score and the determined value. The processor 130 may decode the attention value to detect 3D location information of the object. According to an embodiment, the processor 130 may compare the 3D location information with previously stored 3D location reference information (e.g., 3D location ground truth) to determine a loss of the 3D location information.

The processor 130 may detect final 3D location information of the object by reflecting the loss of the 3D location information. For example, the 3D location information may include 3D coordinate information (e.g., (x3d, y3d, z3d)) of the object in the image. According to an embodiment, the processor 130 may improve the performance of detecting 3D location information by reflecting whether there is a free space in which the degree of influence is large when estimating a depth of the 3D object, when detecting 3D location information (e.g., a 3D distance) of an object, by using the attention mechanism.

According to an embodiment, the processor 130 may detect a 2D dimension and/or a 3D dimension of the object from the 2D image based on the feature information associated with the object. For example, the 2D dimension of the object may indicate a 2D size (e.g., a width and a height) of the object in the image, and the 3D dimension may indicate a 3D size (e.g., a width, a height, and a length) of the object in the image. The 2D dimension and the 3D dimension of the object may further include, respectively, information about 2D and 3D center points of the object.

The processor 130 may detect a 3D orientation (e.g., a yaw) of the object from the 2D image based on the feature information associated with the object. For example, the processor 130 may detect an angle of the object in the image for the apparatus 100 for detecting the 3D object (or the vehicle including the apparatus 100 for detecting the 3D object). For example, the processor 130 may obtain a prediction value of the dimension and/or the orientation of the object using feature information about objects in the image extracted by means of the backbone network.

According to an embodiment, the processor 130 may compare the result of predicting the dimension and/or the orientation of the object with previously stored dimension reference information (dimension ground truth) and/or orientation reference information (e.g., orientation ground truth) to determine a loss of the result of predicting the dimension and/or the orientation of the object. The processor 130 may detect dimension information and/or orientation information of the object by reflecting the loss of the result of predicting the dimension and/or the orientation.

Figure 2:
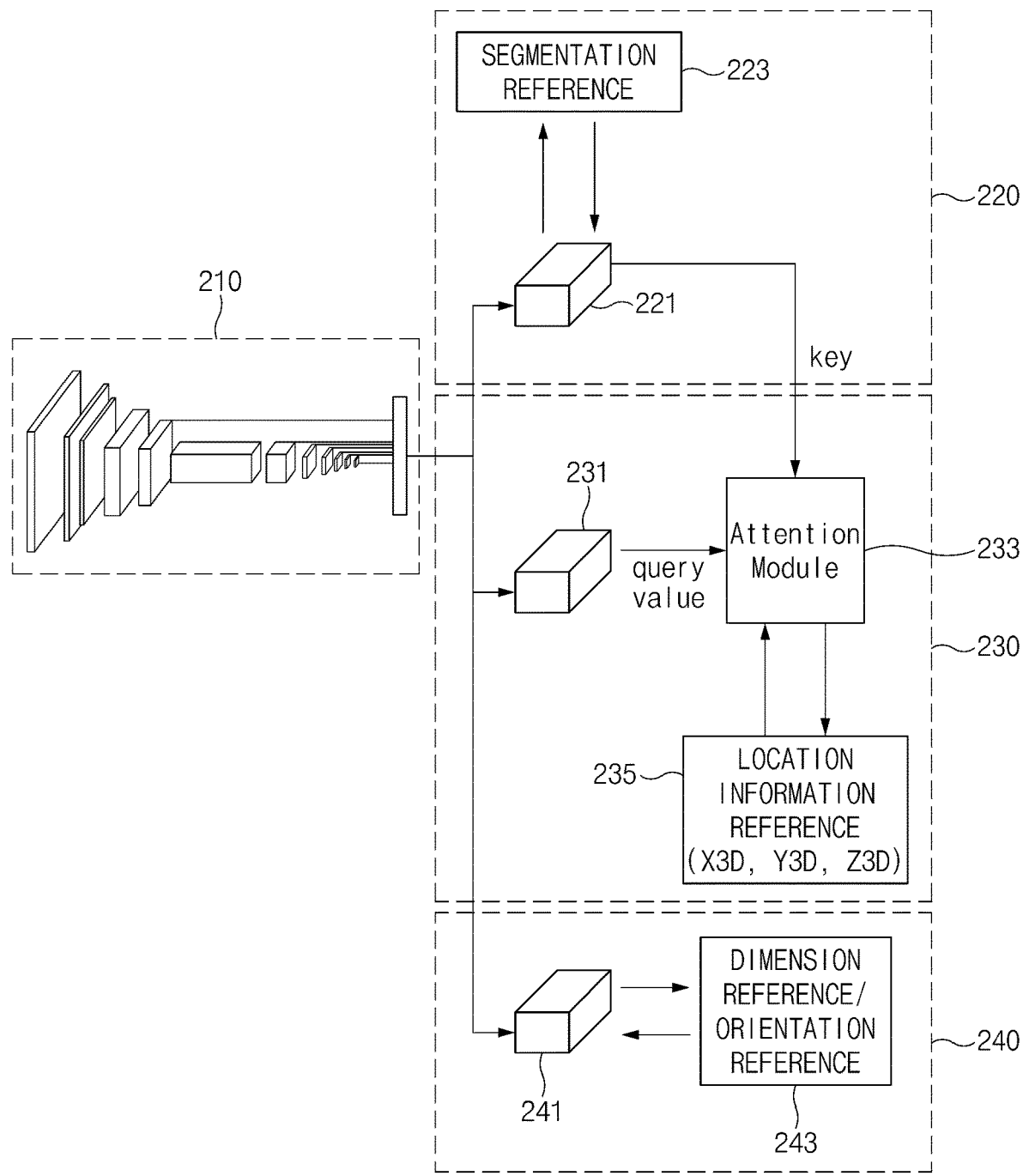
FIG. 2 is a drawing illustrating a configuration of an apparatus for detecting a 3D object according to an embodiment of the present disclosure.

FIG. 2 is a drawing illustrating a configuration of an apparatus for detecting a 3D object according to an embodiment of the present disclosure. FIG. 2 illustrates a 3D object detection network 200 which is included in the processor 130 of the apparatus 100 for detecting a 3D object in FIG. 1 or is implemented by the processor 130 of the apparatus 100 for detecting a 3D object in FIG. 1, according to embodiments. In an embodiment, the 3D object detection network 200 of FIG. 2 may comprise a 3D object detection model and/or an artificial neural network trained (or learned) by the processor 130.

According to an embodiment, the 3D object detection network 200 may include a backbone network 210, a segmentation network 220, a 3D location detection network 230, and/or a dimension/orientation detection network 240. For example, at least some networks (e.g., the backbone network 210, the 3D location detection network 230, and the dimension/orientation detection network 240) in the 3D object detection network 200 may be configured based on a monocular 3D region proposal network (M3D-RPN).

According to an embodiment, the backbone network 210 may extract feature information associated with an object from a 2D image based on a hierarchical structure of a convolutional neural network (CNN). For example, the backbone network 210 may be a deep neural network (DNN), which may be composed of one or more convolution layers, one or more pooling layer, and one or more fully connected layers. The backbone network 210 may have a structure suitable for learning of 2D image (e.g., a 2D image) and may be trained by means of a backpropagation algorithm.

The backbone network 210 may receive a 2D image as an input from the camera 110 of the apparatus 100 for detecting the 3D object. In an embodiment, the backbone network 210 may extract a feature map from the 2D image. The backbone network 210 may make up a scale-based hierarchical structure for the 2D image and may replace data for each scale with time series data to extract feature information about the object from the image. The backbone network 210 may provide feature information associated with a segmentation extracted from the image (e.g., information generated as a result of segmenting the image) to the segmentation network 220. The backbone network 210 may provide the feature information associated with the object, which is extracted from the image, to the 3D location detection network 230 and the dimension/orientation detection network 240.

According to an embodiment, the segmentation network 220 may include a free space prediction module 221 and segmentation reference information 223. The free space prediction module 221 may predict whether there is a free space for each region in the image based on the information received from the backbone network 210. In an embodiment, the free space prediction module 221 may predict a free space with respect to a plurality of regions divided by segmenting the 2D image and may obtain feature information associated with the free space based on the predicted result. For example, the feature information associated with the free space may include confidence indicating whether each region in the image corresponds to the free space. For example, as the predicted confidence is higher, the processor 130 may indicate a possibility that a corresponding region in the 2D image corresponds to the free space is higher.

In embodiments, a location or a size of the object in the image may have an influence on detecting a 3D object (e.g., 3D location information of the object) from the 2D image. The location of the object, among the location and the size of the object in the image, may be an element which has a relatively greater influence on detecting the 3D object when estimating a distance of the object. Furthermore, because the detected object in the image is in contact with the ground, it is possible to use the object as a free space region.

According to an embodiment, the free space prediction module 221 may provide the feature information associated with the free space, which is obtained (or extracted) from the 2D image, to an attention module 233. The attention module 233 may use the feature information as a guide when detecting the 3D object (e.g., 3D location information of the object). For example, the free space prediction module 221 may extract a key to be provided to the attention module 233 from the feature information associated with the free space. The free space prediction module 221 may compare the feature information associated with the free space with the previously stored segmentation reference information 223 (e.g., segmentation ground truth or segmentation GT) to determine a segmentation loss for the feature information associated with the free space.

The segmentation GT may be previously stored data for verifying the accuracy of feature information associated with the segmentation (e.g., the result of predicting the free space). In an embodiment, the segmentation loss may indicate accuracy and/or error information obtained by comparing and analyzing the feature information associated with the segmentation (e.g., the result of predicting the free space) with the segmentation GT. The free space prediction module 221 may extract a key from the feature information associated with the free space with regard to the segmentation loss and may provide the key to the attention module 233.

According to an embodiment, the 3D location detection network 230 may include a 3D location detection module 231, the attention module 233, and 3D location information reference information 235. The 3D location detection module 231 may extract a query and a value to be provided to the attention module 233 from the feature information associated with the object, which is received from the backbone network 210.

According to an embodiment, the attention module 233 may detect 3D location information of the object based on the feature information associated with the free space and the feature information associated with the object, using an attention mechanism.

For example, the attention module 233 may determine an attention score using Equation 1 below.

attention score=query×key        Equation 1

In an embodiment, the attention module 233 may reflect the degree of influence on the free space in the image to detect the 3D location information of the object by using the feature information associated with the object (e.g., feature information associated with a location of a 3D object) as the query and using the feature information associated with the segmentation as the key.

The attention module 233 may apply attention to a feature associated with the free space in the feature information associated with the object. For example, as the feature is more similar to the free space in the feature information associated with the object, the attention score may have a larger value. In an embodiment, because the location of the object has a greater influence than the size of the object in the image, when the distance (or depth) of the object in the image is estimated, and because the object (e.g., the vehicle) is in contact with the ground, when considering a feature on the free space region (e.g., a bottom region), accuracy may be enhanced when the distance of the object is estimated.

The attention module 233 may detect 3D location information of the object based on the attention score. For example, the attention module 233 may determine an attention value based on the attention score and may decode the attention value to detect the 3D location information. The attention mechanism is a mechanism which references all inputs again each time a prediction value is made and concentrates and references things associated with a value to be predicted, which is a mechanism which outputs a predicted result (e.g., the result of predicting/estimating the 3D location information) using an influenced feature (a query), an influencing feature (a key), and a weight (a value) for an influence. Each of the query, the key, and the value may be represented in the form of a matrix.

For example, the attention module 233 may determine the attention score using Equation 2 below.

$$\text{attention value} = \left(\frac{\text{query} \times \text{key}}{\sqrt{d_k}}\right) \times \text{value} \qquad \text{Equation 2}$$

In Equation 2 above, $\sqrt{d_k}$, may be a scale adjustment factor, which may be determined in response to a magnitude of a query matrix and/or a key matrix. The attention value may be substantially proportional to a product of the attention score and the value. The attention module 233 may apply attention (or importance) to the 3D location information based on the attention score.

The attention module 233 may decode the attention value determined by means of Equation 2 above to obtain the 3D location information of the object. In an embodiment, the 3D location information may include 3D coordinate information (e.g., (x3d, y3d, z3d)). The attention module 233 may determine a loss of the 3D location information of the object by comparing and analyzing the obtained 3D location information of the object with previously stored 3D location reference information (e.g., 3D location ground truth).

The processor 130 may detect final 3D location information of the object by reflecting the loss of the 3D location information of the object. According to an embodiment, the 3D location detection network 230 may improve the performance of detecting the 3D location information by reflecting a feature associated with a free space where the degree of influence is large when a depth of a 3D object is estimated by means of the attention module 233, when detecting the 3D location information (e.g., a 3D distance) of the object.

According to an embodiment, the dimension/orientation detection network 240 may include a dimension/orientation detection module 241 and dimension/orientation reference information 243.

According to an embodiment, the dimension/orientation detection module 241 may estimate a 2D dimension, a 3D dimension, and/or a 3D orientation of the object in the image based on the feature information (e.g., the feature map) associated with the object, which is obtained from the backbone network 210. For example, the 2D dimension of the object may indicate a 2D size (e.g., a width and a height) of the object in the image, and the 3D dimension may indicate a 3D size (e.g., a width, a height, and a length) of the object in the image. The 2D dimension and the 3D dimension of the object may further include information about 2D and 3D center points of the object.

For example, the orientation of the object may indicate an angle (e.g., yaw) of the object in the image for the apparatus 100 for detecting the 3D object (or a vehicle including the apparatus 100 for detecting the 3D object). In an embodiment, the dimension/orientation detection module 241 may obtain a prediction value of a dimension and/or an orientation of the object using feature information about objects in the image extracted by means of the backbone network 210.

According to an embodiment, the dimension/orientation detection module 241 may compare the result of predicting the dimension of and/or the orientation of the object with previously stored dimension reference information (dimension ground truth) and/or orientation reference information (e.g., orientation ground truth) 243 to determine a loss of the result of predicting the dimension and/or orientation of the object. The dimension/orientation detection module 241 may finally detect 2D and 3D dimension information and/or 3D orientation information of the object by reflecting the loss of the result of predicting the dimension and/or the orientation.

Figure 3:
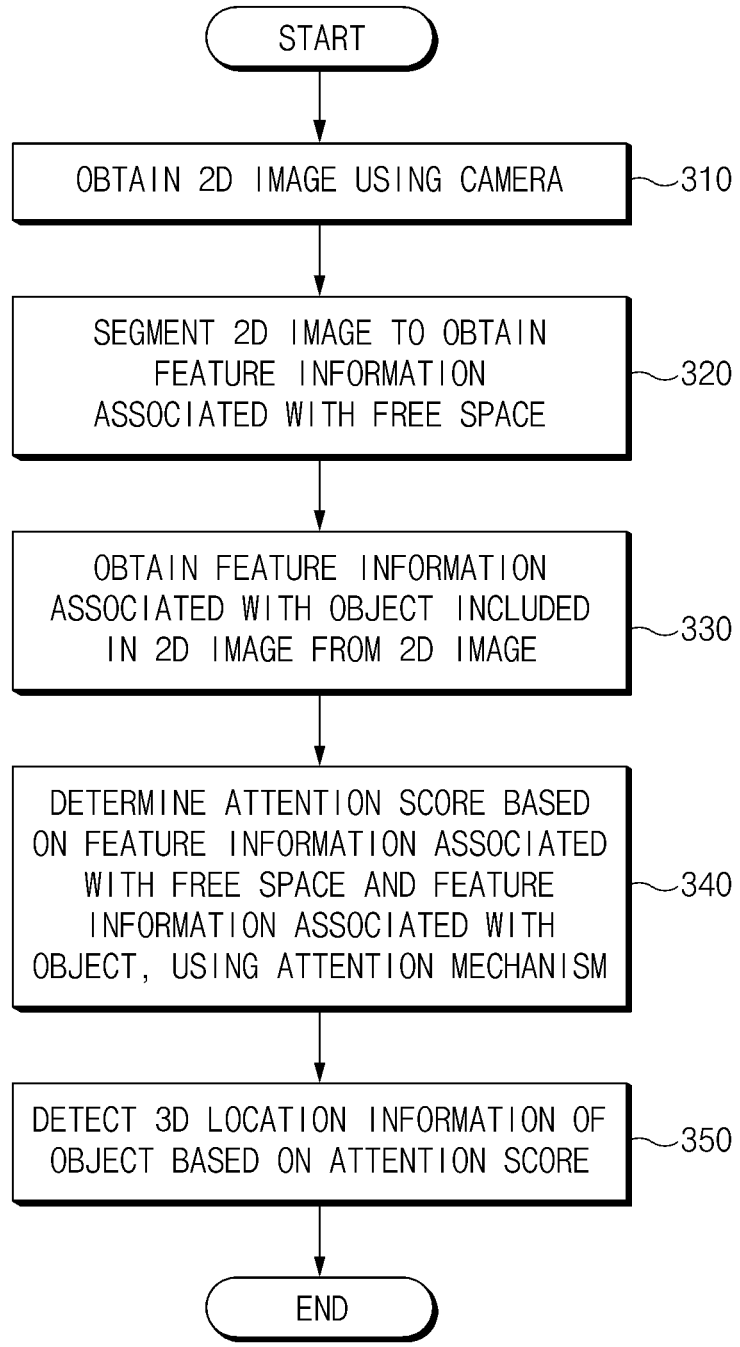
FIG. 3 is a flowchart illustrating a method for detecting a 3D object according to an embodiment of the present disclosure.

FIG. 3 is a flowchart illustrating a method for detecting a 3D object according to an embodiment of the present disclosure.

In an embodiment, the apparatus 100 for detecting a 3D object in FIG. 1 performs the method of FIG. 3. In the description of FIG. 3, an operation described as being performed by an apparatus for detecting a 3D object may be understood as being controlled by the processor 130 of the apparatus 100 for detecting the 3D object, according to an embodiment.

According to an embodiment, in operation 310, the apparatus for detecting the 3D object may obtain a 2D image using a camera. According to an embodiment, the camera may obtain the 2D image. The camera may be a monocular camera having one lens. The 2D image may be a monocular image obtained using the monocular camera.

According to an embodiment, in operation 320, the apparatus for detecting the 3D object may segment the 2D image to obtain feature information associated with a free space. For example, the free space may refer to an object associated with the ground among objects included in the 2D image. For example, the apparatus for detecting the 3D object may segment the 2D image into a plurality of regions and may predict the free space with respect to the plurality of regions. The apparatus for detecting the 3D object may obtain feature information associated with the free space based on the result of predicting the free space.

In an embodiment, the feature information associated with the free space may include a predicted result (e.g., confidence) indicating whether each region in the image corresponds to the free space. According to an embodiment, the apparatus for detecting the 3D object may use the feature information associated with the free space, which is obtained (or extracted) from the 2D image, as a factor which has an influence on when detecting a 3D object (e.g., 3D location information of the object) using the feature information associated with the free space.

According to an embodiment, in operation 330, the apparatus for detecting the 3D object may obtain feature information associated with an object included in the 2D image from the 2D image. For example, the feature information associated with the object may include a feature for obtaining 3D object information extracted from the 2D image.

In an embodiment, the apparatus for detecting the 3D object may extract the feature information associated with the object from the 2D image using a backbone network based on a hierarchical structure of a convolutional neural network (CNN). The apparatus for detecting the 3D object may configure the backbone network having a scale-based hierarchical structure for the 2D image and may replace data for each scale with time series data by means of the backbone network to extract the feature information about the object.

According to an embodiment, in operation 340, the apparatus for detecting the 3D object may determine an attention score based on the feature information associated with the free space and the feature information associated with the object, using the attention mechanism. The attention mechanism is a mechanism which references all inputs again at every time when a prediction value is made and concentrates and references things associated with a value to be predicted, which is a mechanism which outputs a prediction value using an influenced feature (a query), an influencing feature (a key), and a weight (a value) for an influence. Each of the query, the key, and the value may be represented in the form of a matrix.

In an embodiment, in the attention mechanism, importance (e.g., an attention score) for the prediction value may be obtained by a product (or an inner product) of the query and the key. For example, the apparatus for detecting the 3D object may extract a query and a value from the feature information associated with the object, which is extracted by means of the backbone network.

The apparatus for detecting the 3D object may extract a key from the feature information associated with a segmentation, which is obtained by segmenting the image. According to an embodiment, the apparatus for detecting the 3D object may compare the feature information associated with the free space with previously stored segmentation reference information (e.g., segmentation ground truth or segmentation GT) to determine a segmentation loss for the feature information associated with the free space.

The segmentation GT may be previously stored data for verifying the accuracy of feature information associated with the segmentation. For example, the segmentation loss may indicate accuracy and/or error information obtained by comparing and analyzing the feature information associated with the segmentation (e.g., the result of predicting the free space) with the segmentation GT.

The apparatus for detecting the 3D object may extract a key from the feature information associated with the free space with regard to the segmentation loss. For example, the apparatus for detecting the 3D object may reflect the degree of influence on the free space in the image to detect the 3D location information of the object by using the feature information associated with the object (e.g., feature information associated with a location of a 3D object) as the query and using the feature information associated with the segmentation as the key.

In an embodiment, the apparatus for detecting the 3D object may assign a weight to a feature associated with the free space in the feature information associated with the object. For example, as the feature is more similar to the free space in the feature information associated with the object, the attention score may have a larger value. In an embodiment, because the location of the object has a greater influence than the size of the object in the image, when the distance (or depth) of the object in the image is estimated, and because the object (e.g., the vehicle) is in contact with the ground, when considering a feature on the free space region (e.g., a bottom region), accuracy may be enhanced when the distance of the object is estimated.

According to an embodiment, in operation 350, the apparatus for detecting the 3D object may detect 3D location information of the object based on the attention score. For example, the apparatus for detecting the 3D object may perform a product (or an inner product) of the attention score and the value used in the attention mechanism to determine an attention value and may decode the attention value to detect the 3D location information of the object.

In an embodiment, the apparatus for detecting the 3D object may determine the value used in the attention mechanism to be the same as the query. Although the query and the value are generally described herein as being the same as each other because using the key associated with the free space in detecting the 3D location information of the object has a relatively more important influence in the present disclosure, the apparatus for detecting the 3D object may determine the value used in the attention mechanism to be different from the query, in some embodiments. The apparatus for detecting the 3D object may determine an attention value by applying the determined value as a weight to the attention score.

According to an embodiment, the apparatus for detecting the 3D object may compare the 3D location information with previously stored 3D location reference information (e.g., 3D location ground truth) to determine a loss of the 3D location information. The apparatus for detecting the 3D object may finally detect 3D location information of the object by reflecting the loss of the 3D location information. For example, the 3D location information may include 3D coordinate information (e.g., (x3d, y3d, z3d)) of the object in the image.

According to an embodiment, the apparatus for detecting the 3D object may improve the performance of detecting 3D location information by reflecting whether there is a free space in which the degree of influence is large when estimating a depth of the 3D object, when detecting 3D location information (e.g., a 3D distance) of the object, by using the attention mechanism.

According to an embodiment, although not illustrated in FIG. 3, the apparatus for detecting the 3D object may detect 2D and 3D dimensions of the object from the 2D image based on the feature information associated with the object and/or may further detect an orientation of the object from the 2D image based on the feature information associated with the object. For example, the apparatus for detecting the 3D object may detect the 3D object by detecting a 3D location, a dimension, and an orientation of the object in the image.

Figure 4:
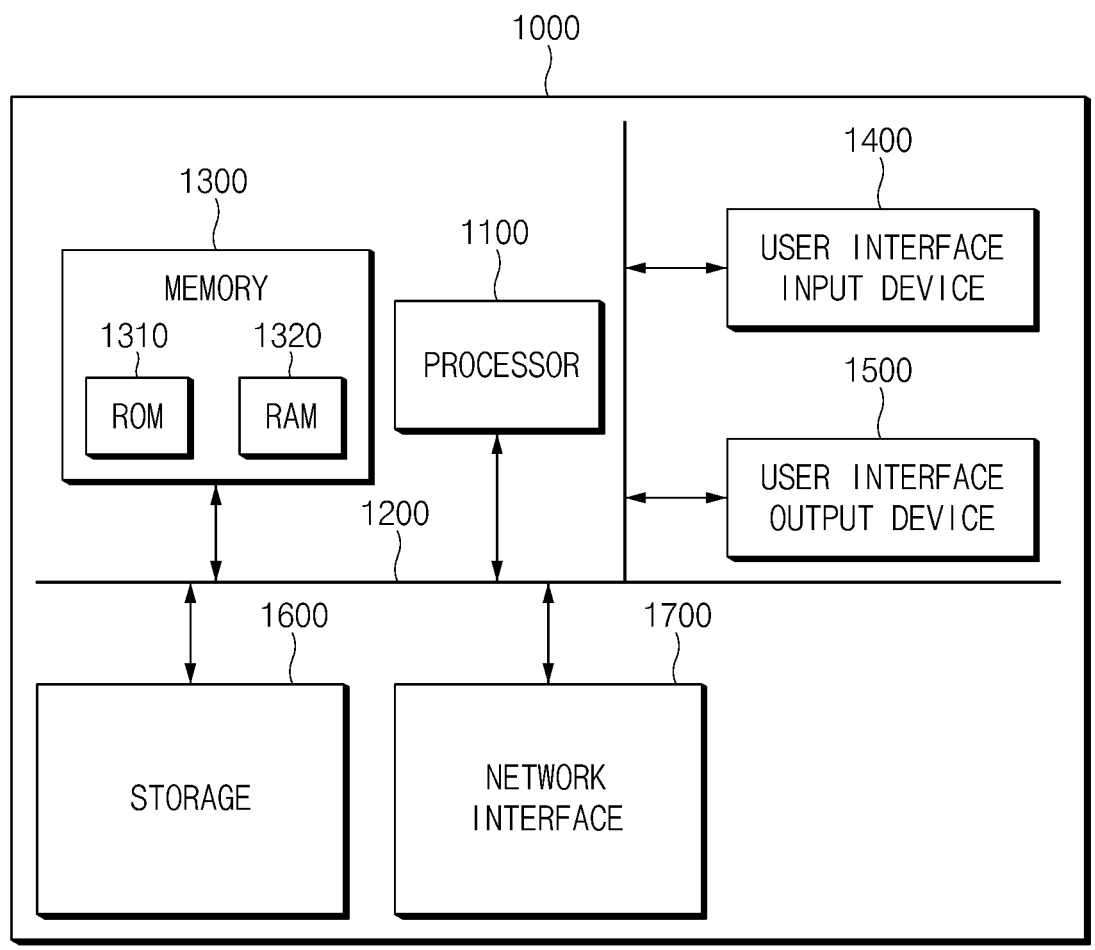
FIG. 4 is a block diagram illustrating a computing system that may be used with embodiments of the present disclosure.

FIG. 4 is a block diagram illustrating a computing system that may be used with embodiments of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed herein may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may improve the performance of detecting a 3D object by using segmentation information of the image to detect a location of the 3D object based on the segmentation information of the image.

Furthermore, the present technology may improve the performance of detecting a 3D object by applying an attention technique when detecting a location of the 3D object using segmentation information of the image.

Furthermore, the present technology may improve the performance of detecting a 3D object by applying attention (e.g., a weight) to a free space region by means of segmentation of the image, when detecting the 3D object from a monocular image.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for detecting a three-dimensional (3D) object, the apparatus comprising:
a camera;
storage; and
a processor configured to
obtain a two-dimensional (2D) image using the camera,
segment the 2D image to obtain feature information associated with a free space,
obtain feature information associated with an object included in the 2D image from the 2D image,
determine an attention score based on the feature information associated with the free space and the feature information associated with the object, using an attention mechanism, wherein the processor is configured to
compare the feature information associated with the free space with previously stored segmentation reference information to determine a segmentation loss for the feature information associated with the free space, and
extract a key from the feature information associated with the free space with regard to the segmentation loss, and detect 3D location information of the object based on the attention score.

2. The apparatus of claim 1, wherein the processor is configured to:
   segment the 2D image into a plurality of regions;
   perform prediction of the free space with respect to the plurality of regions; and
   obtain the feature information associated with the free space based on a result of performing the prediction.

3. The apparatus of claim 1, wherein the processor is configured to:
   extract a query used in the attention mechanism from the feature information associated with the object; and
   determine the attention score by multiplying the query by the key.

4. The apparatus of claim 3, wherein the processor is configured to:
   determine a value used in the attention mechanism to be the same as the query;
   apply the value as a weight to the attention score to determine an attention value; and
   decode the attention value to detect the 3D location information.

5. The apparatus of claim 4, wherein the 3D location information includes 3D coordinate information of the object.

6. The apparatus of claim 4, wherein the processor is configured to compare the 3D location information with previously stored 3D location reference information to determine a loss of the 3D location information.

7. The apparatus of claim 1, wherein the processor includes a backbone network configured to extract the feature information associated with the object from the 2D image based on a hierarchical structure of a convolutional neural network (CNN).

8. The apparatus of claim 1, wherein the processor is configured to detect 2D and 3D dimensions of the object and a 3D orientation of the object from the 2D image, based on the feature information associated with the object.

9. The apparatus of claim 1, wherein the camera is a monocular camera.

10. A method for detecting a three-dimensional (3D) object, the method comprising:
    obtaining a 2D image using a camera;
    segmenting the 2D image to obtain feature information associated with a free space;
    obtaining feature information associated with an object included in the 2D image from the 2D image;
    determining an attention score based on the feature information associated with the free space and the feature information associated with the object, using an attention mechanism; and
    detecting 3D location information of the object based on the attention score,
    wherein determining the attention score includes extracting a key used in the attention mechanism from the feature information associated with the free space, and
    wherein obtaining the key includes
      comparing the feature information associated with the free space with previously stored segmentation reference information to determine a segmentation loss for the feature information associated with the free space, and
      extracting the key from the feature information associated with the free space with regard to the segmentation loss.

11. The method of claim 10, wherein obtaining the feature information associated with the free space includes:
    segmenting the 2D image into a plurality of regions,
    performing prediction of the free space with respect to the plurality of regions, and
    obtaining the feature information associated with the free space based on a result of performing the prediction.

12. The method of claim 10, wherein determining of the attention score includes:
    extracting a query used in the attention mechanism from the feature information associated with the object; and
    determining the attention score by multiplying the query by the key.

13. The method of claim 12, further comprising:
    determining a value used in the attention mechanism to be the same as the query; and
    applying the value as a weight to the attention score to determine an attention value, and
    wherein detecting of the 3D location information includes decoding the attention value to detect the 3D location information.

14. The method of claim 13, wherein the 3D location information includes 3D coordinate information of the object.

15. The method of claim 13, further comprising comparing the 3D location information with previously stored 3D location reference information to determine a loss of the 3D location information.

16. The method of claim 10, wherein obtaining the feature information associated with the object includes extracting the feature information associated with the object from the 2D image using a backbone network based on a hierarchical structure of a convolutional neural network (CNN).

17. The method of claim 10, further comprising:
    detecting 2D and 3D dimensions of the object from the 2D image, based on the feature information associated with the object; and
    detecting an orientation of the object from the 2D image, based on the feature information associated with the object.

18. The method of claim 10, wherein the 2D image is a monocular image obtained using a monocular camera.

* * * * *